US005744664A

United States Patent [19]

Brekner et al.

[11] Patent Number: 5,744,664
[45] Date of Patent: Apr. 28, 1998

[54] CYCLOOLEFIN COPOLYMERS (COCS) AS SUBSTRATE MATERIAL FOR LIQUID-CRYSTAL DISPLAYS

[75] Inventors: Michael-Joachim Brekner, Frankfurt am Main; Dietmar Jungbauer, Weiterstadt, both of Germany

[73] Assignee: Hoechst Aktiengesellschaft, Frankfurt, Germany

[21] Appl. No.: 341,306

[22] Filed: Nov. 16, 1994

Related U.S. Application Data

[63] Continuation of Ser. No. 140,737, Oct. 21, 1993, abandoned, which is a continuation-in-part of Ser. No. 87,024, Jul. 2, 1993, Pat. No. 5,371,158, which is a continuation of Ser. No. 791,566, Nov. 12, 1991, abandoned, which is a continuation-in-part of Ser. No. 548,083, Jul. 5, 1990, Pat. No. 5,087,677.

[30] Foreign Application Priority Data

Oct. 24, 1992 [DE] Germany .......................... 42 35 992.9

[51] Int. Cl.⁶ ................... C10L 1/16; C08F 4/62; C09K 19/38
[52] U.S. Cl. ................... 585/12; 580/10; 580/17; 580/20; 580/350; 526/127; 526/160; 252/299.01
[58] Field of Search .................. 585/10, 12, 17, 585/20, 21, 22, 23, 350; 526/127, 160; 252/299.01

[56] References Cited

U.S. PATENT DOCUMENTS

| | | | |
|---|---|---|---|
| 4,456,638 | 6/1984 | Petcavich | 428/1 |
| 5,087,077 | 2/1992 | Breckner et al. | 526/160 |
| 5,087,677 | 2/1992 | Brekner et al. | 526/160 |
| 5,276,098 | 1/1994 | Kohara et al. | 525/185 |
| 5,334,424 | 8/1994 | Hani et al. | 428/1 |
| 5,371,158 | 12/1994 | Brekner et al. | 526/127 |

FOREIGN PATENT DOCUMENTS

| | | |
|---|---|---|
| 0283164 | 9/1988 | European Pat. Off. |
| 0362814 | 4/1990 | European Pat. Off. |
| 0485893 | 5/1992 | European Pat. Off. |
| 0492982 | 7/1992 | European Pat. Off. |
| 0501370 | 9/1992 | European Pat. Off. |
| 34 17 363 | 5/1985 | Germany . |

OTHER PUBLICATIONS

European abstract 485–893–A.
Derwent abstract 485893.
European abstract 362–814–A.
European abstract 283–164–A.
European abstract 501–370–A.

*Primary Examiner*—Ponnathapura Achutamurthy
*Attorney, Agent, or Firm*—Frommer Lawrence & Haug

[57] ABSTRACT

A substrate for liquid-crystal displays is formed from polymers of polycyclic olefins by polymerization, without ring opening, of at least one monomer of the formula (I), (II), (III), (IV), (V) or (VI). The novel use of cycloolefin copolymers as substrate material facilitates process temperatures of above 180° C. in the production of displays. Cycloolefin copolymers are lighter and less brittle than glass. Compared with other plastics, they have advantages in photoelastic constants, thermal expansion, hardness, density, transparency, water absorption and with respect to birefringence. Furthermore, they have high resistance to polar solvents.

8 Claims, No Drawings

CYCLOOLEFIN COPOLYMERS (COCS) AS SUBSTRATE MATERIAL FOR LIQUID-CRYSTAL DISPLAYS

This application is a continuation of application Ser. No. 08/140,737, filed Oct. 21, 1993 now abandoned; U.S. application Ser. No. 08/140,737 is a continuation-in-part of application Ser. No. 87,024, filed Jul. 2, 1993, now U.S. Pat. No. 5,371,158, as a continuation of application Ser. No. 791,566, filed Nov. 12, 1991, now abandoned; and, application Ser. No. 07/791,566 is a continuation-in-part of application Ser. No. 548,083, filed Jul. 5, 1990, now U.S. Pat. No. 5,087,677.

BACKGROUND OF THE INVENTION

Switching and display devices containing liquid-crystal mixtures (LCDs) are disclosed, for example, in B. Bahadur, "Liquid Crystals, Applications and Uses", World Scientific, Singapore 1990, and EP-B 0 032 362 (=U.S. Pat. No. 4,367,924). Liquid-crystal displays are devices which change their optical transmission properties, for example due to electrical switching, in such a way that light which is incident (and possibly reflected again) is modulated in intensity. Examples are the known watch and calculator displays or liquid-crystal displays in the OA (office automation) or TV sector (see also Liquid Crystal Device Handbook, Nikkan Kogyo Shimbun, Tokyo, 1989; ISBN 4-526-02590-9C 3054, and the papers cited therein).

These LC displays are generally constructed in such a way that a liquid-crystal layer is included on both sides by layers which are usually, in this sequence starting from the LC layer, at least one alignment layer, electrodes and a limiting plate ("substrate"). In addition, they contain one polarizer if they are operated in "guest-host" mode or in reflective mode, or two polarizers if the transmissive birefringence mode is used. Switching and display elements may, if desired, contain further auxiliary layers, such as, for example, diffusion barrier or insulation layers.

The state of the art (see, for example, the references cited above) comprises using substrates made of glass. However, the disadvantages of glass include the high price, the high weight and the brittleness. In addition, the use of glass in principle always entails the danger of, in particular, sodium ions diffusing into the liquid-crystal layer and thus impairing the opto-electrical properties of the display.

Conceivable replacement materials are transparent plastics, such as poly(methyl methacrylate) (PMMA) and polycarbonate (PC). However, both materials have inadequate heat resistance (PMMA: $T_g=110°$ C.; PC: $T_g=130°$ C.) and excessive water absorption. In addition, birefringence causes problems in PMMA.

The object of the present invention was to provide a substrate material for LCDs which avoids the above-described disadvantages.

The object is achieved by using cycloolefin copolymers as substrate material for LCDs.

SUMMARY OF THE INVENTION

The invention relates to a substrate for liquid-crystal displays, comprising a polymer or a mixture of polymers of polycyclic olefins, formed by polymerization, without ring opening, of at least one monomer of the formula (I), (II), (III), (IV), (V) or (VI):

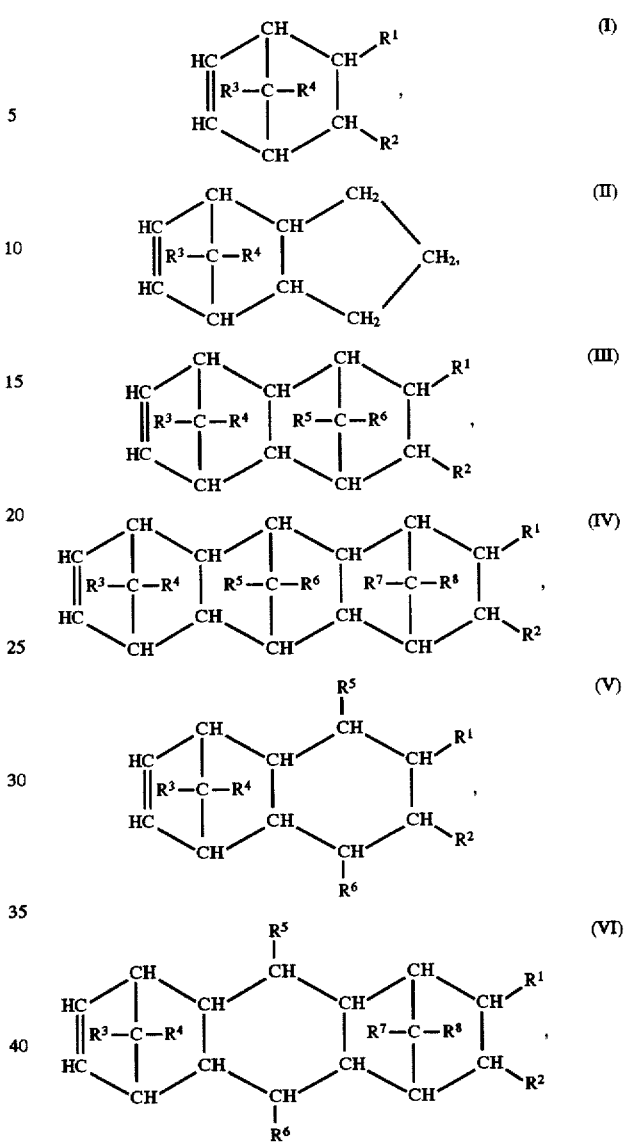

in which $R^1$, $R^2$, $R^3$, $R^4$, $R^5$, $R^6$, $R^7$ and $R^8$ are identical or different and are a hydrogen atom or a $C_1$–$C_8$-alkyl radical, where identical radicals in the various formulae may have different meanings, into which substrate a cycloolefin of the formula (VII) may additionally have been incorporated,

in which n is a number from 2 to 10; and which may contain, as a further additive, an acyclic 1-olefin of the formula (VIII)

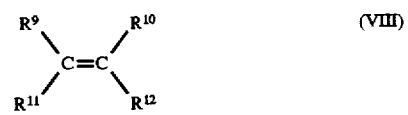

in which $R^9$, $R^{10}$, $R^{11}$ and $R^{12}$ are identical or different and are a hydrogen atom or a $C_1$–$C_8$-alkyl radical.

The use according to the invention of cycloolefin copolymers makes process temperatures of above 180° C. possible. Cycloolefin copolymers are lighter and less brittle than glass. Compared with other plastics, they have advantages in photoelastic constants, thermal expansion, hardness, density, transparency, water absorption and with respect to birefringence. In addition, they have high resistance to polar solvents.

- the yield stress is from 40 to 66 MPa;
- the substrate is soluble in toluene, xylene, cyclohexane, Exxsol (hydrogenated diesel fraction), chloroform and diethyl ether;
- the substrate is insoluble in water, alcohols, ketones (acetone), esters and amides (DMF, DMAC and NMP);
- the substrate is chemically resistant to aqueous and concentrated acid, such as HCl and $H_2SO_3$, and bases, such as NaOH and KOH.

A further essential property of the COC base types is their low inherent birefringence, i.e. low anisotropy of the molecular polarizability, and their resistance to hydrolysis.

DESCRIPTION OF THE PREFERRED EMBODIMENTS

The cycloolefin polymers preferably used for the substrates, abbreviated to COC again below, are cycloolefins such as norbornene-ethylene or tetracyclododeceneethylene copolymers. In particular, they are copolymers of norbornene and ethylene which have a thermal distortion resistance for a range of the glass transition temperature of from 140° to 200° C. As an alternative to the COC base types, other norbornene derivatives can also be copolymerized with various 1-olefins. It is also possible to use alloys of various COC types.

In a further embodiment of the substrate, the latter is formed from polymers of polycyclic olefins by polymerization, without ring opening, of from 0.1 to 100% by weight, based on the total amount of monomers, of at least one monomer of the formula (I), (II), (III), (IV), (V) or (VI):

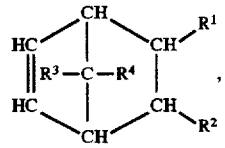 (I)

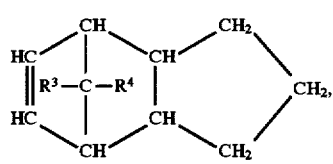 (II)

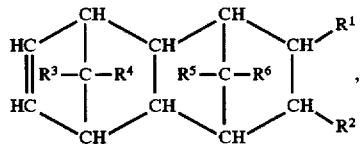 (III)

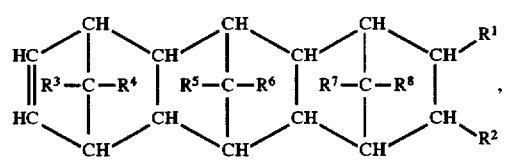 (IV)

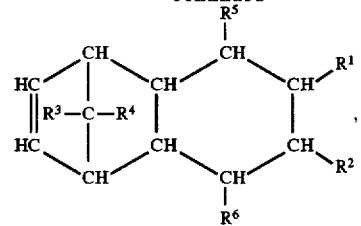 (V)

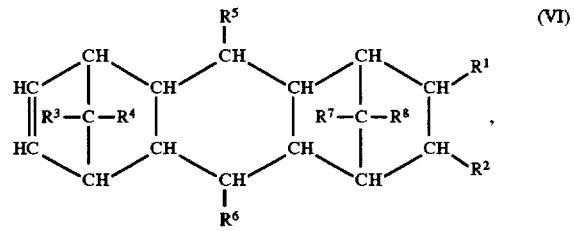 (VI)

in which $R^1$, $R^2$, $R^3$, $R^4$, $R^5$, $R^6$, $R^7$ and $R^8$ are identical or different and are a hydrogen atom or a $C_1$–$C_8$-alkyl radical, where identical radicals in the various formulae may have different meanings, from 0 to 99.0% by weight, based on the total amount of monomers, of a cycloolefin of the formula (VII)

 (VII)

in which n is a number from 2 to 10, and from 0 to 99.9% by weight, based on the total amount of monomers, of at least one acyclic 1-olefin of the formula (VIII)

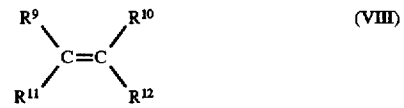 (VIII)

in which $R^9$, $R^{10}$, $R^{11}$ and $R^{12}$ are identical or different and are a hydrogen atom or a $C_1$–$C_8$-alkyl radical. Norbornene-ethylene copolymers are preferred over DMON-ethylene copolymers since norbornene-ethylene copolymers reach a level of high isotropy of the polarizability at higher glass transition temperatures than in the case of DMON-ethylene copolymers (DMON: dimethano-octa hydrynaphthalene).

Examples of the synthesis of individual COC types and the description of the process for the preparation of COC types by bulk polymerization using specific Metallocene catalysts are described in German Patent Application P 40 36 264.7.

The polymerization is conducted in the presence of a catalyst which comprises an aluminoxane of the formula (IX)

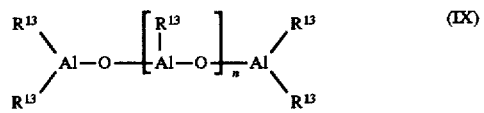 (IX)

for the linear type and/or of the formula (X)

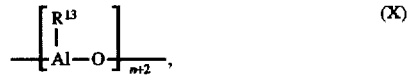 (X)

for the cyclic type, where, in the formulae (IX) and (X), $R^{13}$ is a $C_1$–$C_8$-alkyl group, phenyl or benzyl, and n is an integer from 2 to 50, and a metallocene of the formula (XI)

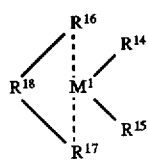 (XI)

in which

M¹ is titanium, zirconium, hafnium, vanadium, niobium or tantalum, $R^{14}$ and $R^5$ are identical or different and are a hydrogen atom, a halogen atom, a $C_1$–$C_{10}$-alkyl group, a $C_1$–$C_{10}$-alkoxy group, a $C_8$–$C_{10}$-aryl group, a $C_8$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^{16}$ and $R^{17}$ are a monocyclic or polycyclic hydrocarbon radical which can form a sandwich structure with the central atom M¹, $R^{18}$ is

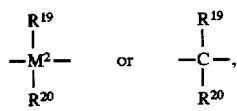

=$BR^{19}$=$AlR^{18}$, —Ge—, —Sn—, —O—, —S—, =SO, =$SO_2$, =$NR^{18}$, =CO, =$PR^{18}$ or =P(Q)$R^{19}$ where $R^{18}$ and $R^{20}$ are identical or different and are a halogen atom, a $C_1$–$C_{10}$-alkyl group, a $C_1$–$C_{10}$-fluoro-alkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$, in each case with the atoms connecting them, form a ring, and $R^{19}$ or $R^{20}$ is a hydrogen atom and M² is silicon, germanium or tin, wherein polymerization is carried out in the liquid cycloolefin monomer or cycloolefin monomer mixture or in an at least 95 percent by volume cycloolefin solution, the substituents $R^{16}$ and $R^{17}$ in the formula (XI) being different from one another.

Polymerization using catalysts based on Metallocenes is preferred not least due to the non-toxic properties of these compounds. Particularly unacceptable processes are those for the preparation of substrate materials using catalysts based on vanadium. Vanadium is extremely toxic, and in general traces of vanadium remain in the substrate material, which makes particular safety measures necessary during reprocessing thereof.

The LCD substrates according to the invention made from COC can be employed in liquid-crystal displays of all types, in particular including ferroelectric ones. In addition to the sources cited at the outset, EP-A-0 474 655 and EP-A-0 477 257, for example, also describe suitable displays.

The invention is described in greater detail by the example.

EXAMPLE

Construction of a Test Cell

In order to demonstrate the advantageous properties of the substrates according to the invention, a test cell is produced, filled with a ferroelectric liquid-crystal mixture and subsequently tested.

To this end, a norbornene-ethylene copolymer, as described in the EP-A 0 485 893, Example 11, is coated with indium/tin oxide (ITO), cut and treated photolithographically in such a way that small substrates having an electrode area of about 8×8 mm are produced. These substrates are then cleaned at about 60° C. in an ultrasound bath first in an aqueous surfactant solution and subsequently twice in Millipore water (=demineralized water which has been substantially freed from particles by means of a Millipore filter unit). When the substrates have been dried by means of hot air, they are coated with a wet film of a 0.5% strength by weight solution of P1 (see below) in cyclohexanone. The coating is carried out by means of a spin coater, but can also be effected using other methods, for example printing or immersion. The solution is dripped onto the substrate until the latter is covered completely, pre-spun for 5 minutes at 500 rpm, followed by the main spinning for 30 minutes at 4000 rpm. The wet film is dried at 160° C. for 30 minutes. The film thickness of P1 which remains is about 15 nm. This alignment layer is then rubbed with a velvet-like fabric on a rubbing machine (stage speed 100 nm/min; roller speed 500 rpm; power consumption 0.4 A). The spin coater is then used to apply the 1.8 μm spacers (0.05% strength by weight solution in isopropanol; 20 sec., 2000 rpm). The plotter is used to print the adhesive frame, and the liquid-crystal test cell is then bonded with the rubbing directions parallel using a membrane press (adhesive conditions: Epoxy 304 (5 parts)+curing agent 310 B (1 part) (both from E.H.C., Japan); ethyl acetate (4:1) is then added to the mixture. Curing temperatures: 20 min. 60° C./20 min. 90° C./40 min. 150° C.).

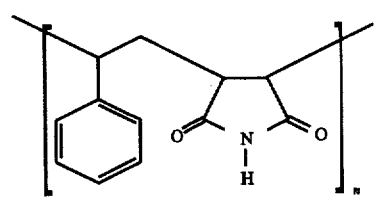

The electro-optical parameters of the resultant test cell are then determined using a liquid-crystal mixture.

The FLC mixture M1 employed has the following composition (in mol %):

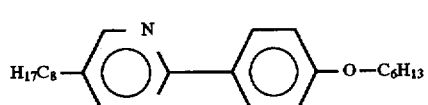

14.58

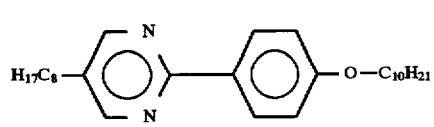

9.72

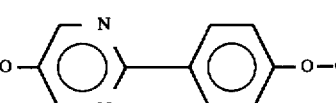  13.08

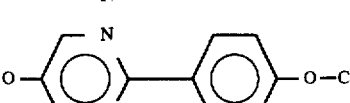  9.11

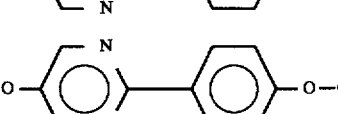  4.21

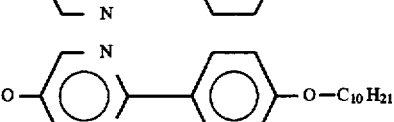  9.62

  7.65

  14.42

  10.50

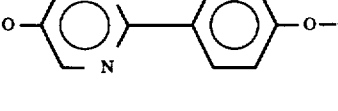  1.99

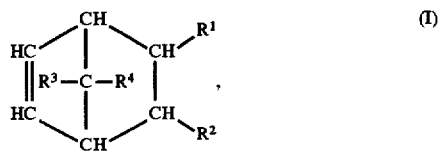  5.12 and the phase sequence $S_C^*$ 65 $S_A^*$ 73 N* 86 I and a spontaneous polarization of of 38 nC.cm$^{-2}$ at a temperature of 25° C.

Parameters Measured

| | |
|---|---|
| M1 + COC substrate | |
| Effective tilt angle $\theta_{eff}$ (chevron structure) | 8.5° to 9° |
| Alignment of the liquid crystal | very good |
| B*$_{max}$ (maximum bias at a pulse width of 50 μs) | ~4 |
| Twist states | none |

The parameters measured confirm that the use of the substrates according to the invention made from COC gives liquid-crystal cells having excellent electro-optical properties.

We claim:

1. A substrate for liquid-crystal displays, which is formed from polymers of polycyclic olefins which are obtained by polymerization, without ring opening, of from 0.1 to 100% by weight, based on the total amount of monomers, of at least one monomer of the formula (I), (II), (III), (IV), (V) or (VI):

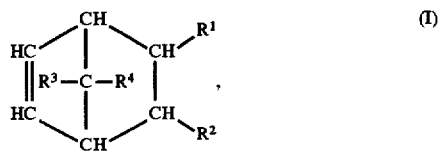  (I)

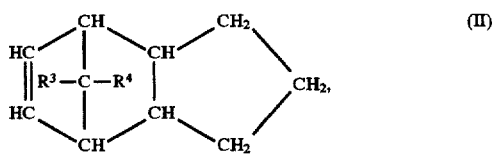  (II)

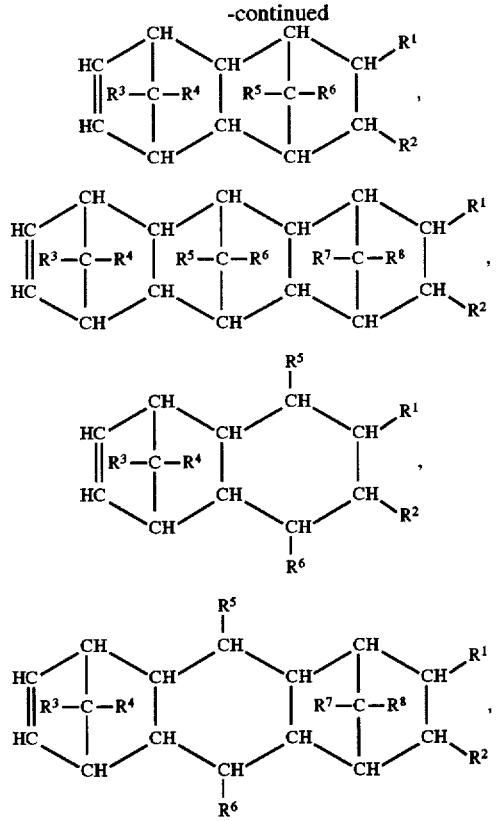

in which $R^1$, $R^2$, $R^3$, $R^4$, $R^5$, $R^6$, $R^7$ and $R^8$ are identical or different and are a hydrogen atom or a $C_1$–$C_8$-alkyl radical, where identical radicals in the different formulae may have different meanings, from 0 to 99.0% by weight, based on the total amount of monomers, of a cycloolefin of the formula (VI)

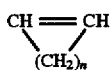

in which n is a number from 2 to 10, and from 0 to 99.9% by weight, based on the total amount of monomers, of at least one acyclic 1-olefin of the formula (VIII)

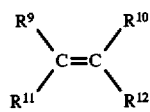

in which $R^9$, $R^{10}$, $R^{11}$ and $R^{12}$ are identical or different and are a hydrogen atom or a $C_1$–$C_8$-alkyl radical said polymerization being conducted prepared at a temperature of from 20° to 150° C. and at a pressure of from 0.01 to 64 bar, in the presence of a catalyst which comprises an aluminoxane of the formula (IX)

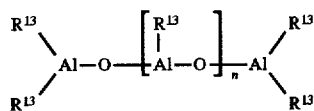

for the linear type and/or of the formula (X)

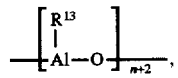

for the cyclic type, where, in the formulae (IX) and (X), $R^{13}$ is a $C_1$–$C_8$-alkyl group, phenyl or benzyl, and n is an integer from 2 to 50, and a metallocene of the formula (XI)

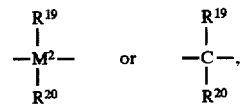

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^{16}$ and $R^7$ are a monocyclic or polycyclic hydrocarbon radical which can form a sandwich structure with the central atom $M^1$, $R^{18}$ is $$\begin{array}{c} R^{19} \\ | \\ -M^2- \\ | \\ R^{20} \end{array} \quad \text{or} \quad \begin{array}{c} R^{19} \\ | \\ -C-, \\ | \\ R^{20} \end{array}$$

$=BR^{19}$, $=AlR^{18}$, —Ge—, —Sn—, —O—, —S—, $=SO$, $=SO_2$, $=NR^{18}$, $=CO$, $=PR^{18}$ or $=P(Q)R^{19}$ where $R^{18}$ and $R^{20}$ are identical or different and are a halogen atom, a $C_1$–$C_{10}$-alkyl group, a $C_1$–$C_{10}$-fluoro-alkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{19}$ and $R^{20}$ or $R^{19}$ and $R^{21}$, in each case with the atoms connecting them, form a ring, and $R^{19}$ or $R^{20}$ is a hydrogen atom and $M^2$ is silicon, germanium or tin, wherein polymerization is carried out in the liquid cycloolefin monomer or cycloolefin monomer mixture or in an at least 95 percent by volume cycloolefin solution, the substituents $R^{16}$ and $R^{17}$ in the formula (XI) being different from one another, and wherein the yield stress of the polymer is from 40 to 66 MPa.

2. A substrate as claimed in claim 1, which comprises a norbornene-ethylene copolymer or a tetracyclododecene-ethylene copolymer.

3. A substrate as claimed in claim 1, which comprises copolymers of norbornene and ethylene and has a heat distortion resistance for a range of the glass transition temperature of from 140° to 200° C.

4. A liquid-crystal display comprising a substrate as claimed in claim 1.

5. A liquid-crystal display as claimed in claim 4, which is ferroelectric.

6. A substrate a for liquid-crystal display, comprising a copolymer of norbornene and ethylene obtained by polymerization without ring opening, having a heat distortion resistance measured by glass transition temperature of from 140° C. to 200° C., a yield stress from 40 to 66 MPa.

7. A method of preparing a liquid crystal display substrate comprising preparing a copolymer of norbornene and ethylene from polymerization without ring opening said polymer, having a heat distortion resistance measured by glass transition temperature of from 140° C. to 200° C., a yield stress from 40 to 66 MPa.

8. A method of using a substrate comprising incorporating the substrate into a liquid crystal display, wherein the substrate comprises a copolymer of norbornene and ethylene from polymerization without ring opening, having a heat distortion resistance measured by glass transition temperature of from 140° C. to 200° C., a yield stress from 40 to 66 MPa.

* * * * *